May 23, 1972  R. DU WAYNE ANDERSON  3,664,686
TWO PIN ADJUSTABLE HITCH
Filed July 28, 1970
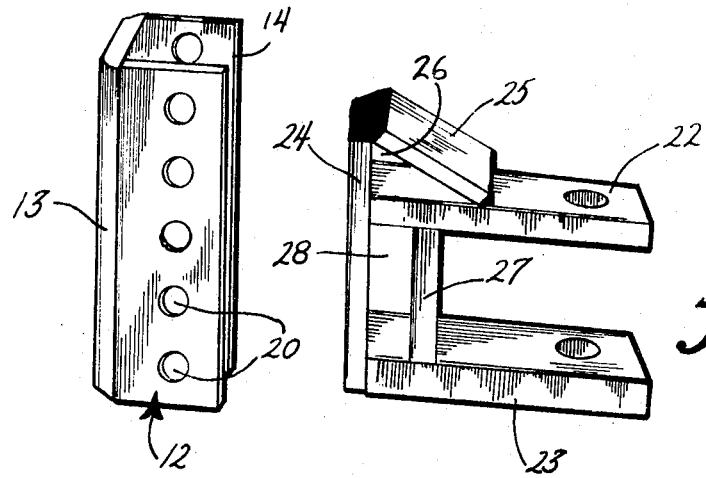
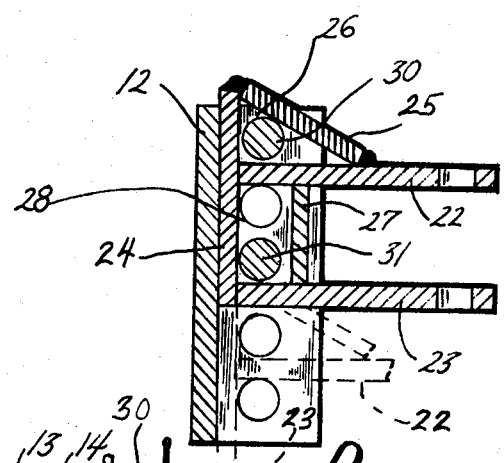
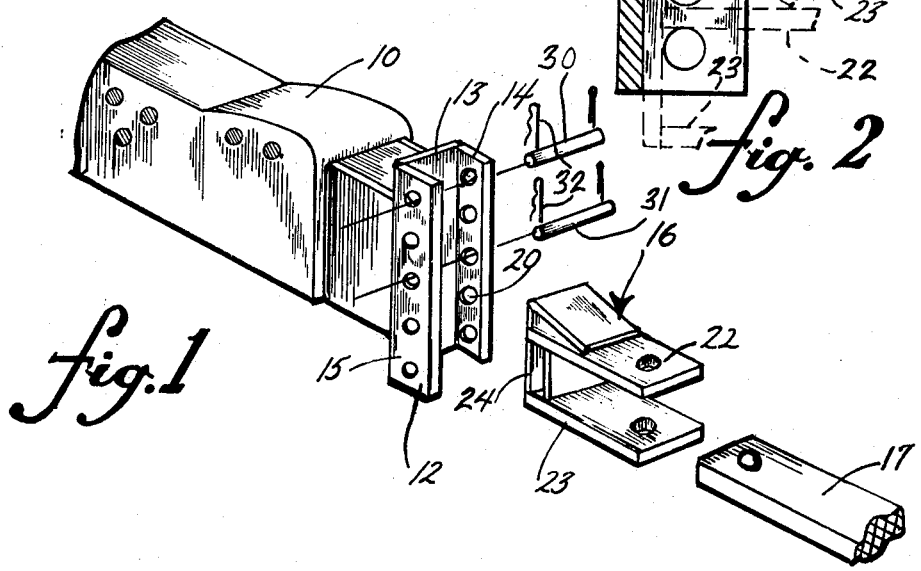
INVENTOR
ROBERT DUWAYNE ANDERSON
BY
Dugger, Peterson, Johnson, & Westman

United States Patent Office 3,664,686
Patented May 23, 1972

3,664,686
TWO PIN ADJUSTABLE HITCH
Robert DuWayne Anderson, Murdock, Minn., assignor to TCI, Inc., Benson, Minn.
Filed July 28, 1970, Ser. No. 58,795
Int. Cl. B60d *1/02*
U.S. Cl. 280—490
3 Claims

ABSTRACT OF THE DISCLOSURE

A quick adjustable hitch utilizing two removable pins that hold a hitch clevis stable with respect to a connecting channel, and which permits a wide range of vertical adjustment for the clevis in a convenient manner.

BACKGROUND OF THE INVENTION (1) Field of the invention

The present invention relates to adjustable clevises for hitches.

(2) Prior art

Various adjustable hitches have been utilized. Pat. No. 3,471,171 shows a bolted hitch structure that can be reversed for different height adjustment of a hitch. Further, Pat. Nos. 3,093,394, 2,539,666 and 2,465,641 show adjustable hitches of various constructions.

However, none provide a stable, quickly adjustable, easily manufactured hitch that can give a wide range of vertical height adjustment in a convenient manner.

SUMMARY OF THE INVENTION

The present invention relates to a clevis for a towed implement hitch that can be quickly adjusted by removing large diameter pins, and readjusted to a different height in a stable assembly. The unit is constructed to give good stability to the clevis, and a wide range of adjustment is provided.

BRIEF DESCRIPTION OF THE DRAWINGS

FIG. 1 is a fragmentary perspective view showing the hitch pin clevis and the hitch to which it is attached in exploded view;

FIG. 2 is a sectional view showing the hitch clevis mounted in position with the pins in place for holding the clevis in operative condition; and FIG. 3 is an exploded side perspective view of a mounting channel and hitch clevis of the present invention.

DESCRIPTION OF THE PREFERRED EMBODIMENT

Referring to the drawings and the numerals of reference therein, a hitch pole or tongue 10, which is on a trailing implement such as a fertilizer spreader trailer, a field cultivator or other desired towed implement has an upright channel shaped member 12 fixed to the forward end thereof. The channel shaped member, as shown, has a base 13, and a pair of spaced apart parallel legs 14 and 15.

The hitch clevis illustrated generally at 16 is used for connecting to a tractor tongue or towing implement tongue 17 with a suitable pin. The clevis 16 is constructed to fit closely between the legs 14, 15 of channel 12. As shown, the channel legs 14 and 15 have a plurality of aligning apertures 20 and the clevis 16 is made so that it has openings that align with the openings in the legs when properly positioned.

The clevis is made so that there is no need for drilling holes in it for the cross pins, and it is constructed of a pair of substantially horizontal (in hitched position) parallel metal strap members 22 and 23, which are spaced apart in vertical direction to permit the tractor tongue 17 to fit between them, and these horizontal members are held by a rear vertical member 24 that extends between the legs 14 and 15. The members 22 and 23 are welded to vertical member 24. A top brace 25 is welded between the top surface of member 22 and the upper end portion of vertical member 24, as shown, and this provides a cross aperture 26 that permits fastening the clevis to the channel. Further, a brace member 27 is provided between the members 22 and 23 parallel to the member 24, and spaced from member 24 a sufficient distance so that an opening or aperture 28 is formed. This unit is welded together, made out of flat strap metal, and is therefore very economical to make because punching and shearing operations form all of the parts and it is merely a matter of welding them together to provide the structure.

The clevis is fastened to the channel 12 so that the clevis makes a fairly rigid connection. As shown, the aperture 26 is of size to receive a first cross pin 30 extending between aligning apertures 20 of legs 14 and 15. The aperture 28, which is elongated in vertical direction, receives a pin 31 that extends between apertures 20 in legs 14 and 15 as well. The pins 30 and 31 can have cotter pins at one end to hold them in place, and quick removable safety catch pins 32 at the other end to hold them in place so that they can be easily removed for changing the position of the clevis in the channels. The catch pins are conventional fasteners but are quickly removable.

It is important to note that the aperture 28 is of size to overlap two of the holes or apertures 20 and legs 14 and 15, so that the pin 31 can either be placed two holes away from the pin 30 in vertical direction to give greater vertical stability to the clevis, or if a greater height adjustment is necessary, for example if the clevis was to be moved as far downwardly in the channel as possible, a pin can be inserted directly below the member 22, so that the pins 30 and 31 will then be adjacent holes 20 in the channel member. This would give a greater height adjustment if the unit was placed as shown in its dotted position in FIG. 2.

The height adjustment is very quick because only two pins have to be taken out, and the two pins give great stability to the clevis. The construction is simple because of the use of strap material that can be welded together to form the two apertures, one of which is elongated to overlap two openings in the fastening channel. The pins also are of size to hold the clevis from excessive looseness. The pins fit the apertures to hold the vertical member 24 against the base 13 of channel 12. The top brace 25 serves two functions. It forms the aperture 26 for the pin 30 and also braces the member 22 for carrying vertical loads. The downward load of the tongue 10 does not cause any bending of the member 22. The brace 25 carries a great bit of this load and makes for a very strong clevis.

What is claimed is:

1. In a hitch construction for providing vertical adjustment between a towing vehicle drawbar and a hitch tongue on a towed vehicle, a channel member attached to the hitch tongue and having substantially parallel legs extending in an upright direction, said parallel legs having aligning apertures therethrough spaced in vertical direction, and a clevis member adapted to be attached to said channel member, said clevis member comprising two strap members spaced to receive the drawbar of a towing vehicle, a vertical member connecting said two strap members at first ends thereof, said vertical member being of size to closely fit between the legs of said channel member and extending outwardly beyond one of said strap members, a brace member angled from the outwardly extending end of said vertical member back to said one strap member and fixed therebetween to thereby form a first clevis aperture, and a second brace member substantially parallel to and spaced from said vertical member and connected to said strap members, said second brace member forming a second clevis aperture in cooperation with said vertical member and said strap members, and at least two pin means extending through aligned vertically spaced apertures in said channel and the apertures in said clevis to support the clevis on said channel.

2. The combination as specified in claim 1 wherein said pin means are slidably mounted through said apertures, and quickly removable securing means on at least one end of each pin means.

3. The combination as specified in claim 1 wherein said second clevis aperture formed by said second brace member is of a vertical length sufficient to permit passage of pin means located, in at least two sets of the vertically aligned apertures in said channel member when one pin means is extending through the first clevis aperture formed by said angled first brace member.

References Cited
UNITED STATES PATENTS

| | | | |
|---|---|---|---|
| 2,847,232 | 8/1958 | Graham | 280—490 |
| 3,326,575 | 6/1967 | Shepley | 280—515 |
| 3,369,628 | 2/1968 | Heinlein | 280—515 |
| 3,035,856 | 5/1962 | Mleczko | 280—490 |

BENJAMIN HERSH, Primary Examiner

R. R. SONG, Assistant Examiner